US006283631B1

United States Patent
(12) United States Patent
Gousset et al.

(10) Patent No.: US 6,283,631 B1
(45) Date of Patent: Sep. 4, 2001

(54) ELECTRONIC DEVICE FOR MODELING THE TEMPERATURE OF A MOTOR

(75) Inventors: Alain Gousset, Nanterre; Philippe Guibert, Chatou, both of (FR)

(73) Assignee: Schneider Electric SA, Boulogne Billancourt (FR)

( * ) Notice: Subject to any disclaimer, the term of this patent is extended or adjusted under 35 U.S.C. 154(b) by 0 days.

(21) Appl. No.: 09/212,406

(22) Filed: Dec. 16, 1998

(30) Foreign Application Priority Data

Dec. 19, 1997 (FR) ........................ 97 16446

(51) Int. Cl.[7] ........................ G01K 1/08

(52) U.S. Cl. ........................ 374/152; 318/471; 702/130

(58) Field of Search ........................ 374/152, 134; 318/471, 473; 388/934; 702/57, 132, 130, FOR 142

(56) References Cited

U.S. PATENT DOCUMENTS

| | | | | |
|---|---|---|---|---|
| 3,808,503 | | 4/1974 | Hentschel | 361/30 |
| 3,808,516 | * | 4/1974 | Hentschel | 318/471 |
| 4,547,826 | * | 10/1985 | Premerlani | 702/132 |
| 4,939,437 | * | 7/1990 | Farag et al. | 318/473 |
| 5,539,601 | * | 7/1996 | Farag | 361/23 |

FOREIGN PATENT DOCUMENTS

| | | | | |
|---|---|---|---|---|
| 1169501 | * | 6/1984 | (CA) | 702/FOR 142 |
| 0 237 412 A1 | | 9/1987 | (EP) . | |
| 0 347 703 A1 | | 12/1989 | (EP) . | |

* cited by examiner

*Primary Examiner*—Diego Gutierrez
*Assistant Examiner*—Stanley J. Pruchnic, Jr.
(74) *Attorney, Agent, or Firm*—Oblon, Spivak, McClelland, Maier & Neustadt, P.C.

(57) ABSTRACT

An electronic device for modeling the temperature of a motor by utilizing signals output from current sensors placed on motor power supply phases. Signals from the current sensors are sent to an interface that outputs a voltage which is an image of a summation a ratio of the motor currents sensed by each of the current sensors to a corresponding adjustment current for each of the phases. A calculation circuit utilizes the voltage as an input and outputs a charging current wave stream, the amplitude and the duration of the charging current being proportional to the summation the ratio. An RC type modeling circuit is provided to receive the charging current wave stream and to model the thermal state of the motor based on the charging current wave stream.

8 Claims, 3 Drawing Sheets

U V W
C5
C1
C2
C3
C4
Cw
Cv
Cu
CALCULATE IM/IR
Inw
Inv
Inu
SUMMATE CURRENTS
Vr
I2 LAW
M

ELECTRONIC DEVICE FOR MODELING THE TEMPERATURE OF A MOTOR

BACKGROUND OF THE INVENTION

1. Field of the Invention

This invention relates to an electronic device modeling the temperature rise in a motor, making use of current sensors placed on the motor power supply phases.

2. Discussion of the Background

Temperature rises dangerous for a motor may be caused by a low prolonged overload, a slight phase unbalance, excessively long or frequent startups, the motor getting unable to turn, or intermittent conditions. An electronic protection relay takes action by calculating the motor temperature starting from signals supplied by sensors located on each of the power supply phases. This calculation is done taking account of thermal inertia.

The electronic relay described in patent U.S. Pat. No. 3,808,503 comprises a current sensor on each motor power supply phase sending an "image" signal of the phase current to an electronic processing circuit that outputs a current proportional to the square of the motor current, to a circuit modeling the motor temperature rise consisting of an R-C circuit.

SUMMARY OF THE INVENTION

One particular purpose of the invention is to avoid the need to inject a current proportional to the square of the motor current into the motor temperature modeling circuit, as is done in known solutions. This solution gives a wider "customer" adjustment range that can be obtained with known solutions.

The device according to the invention is characterized by the fact that current sensor signals are sent to interface means that output a voltage which is an image voltage of the ratio of the motor current to the adjustment current, and that the calculation means use the said voltage to supply a charge current wave stream, in which the amplitude and duration are each proportional to the above ratio, to the modeling circuit.

BRIEF DESCRIPTION OF THE DRAWINGS

The invention will now be described in more detail with reference to an embodiment given as an example and shown on the attached drawings, in which.

DESCRIPTION OF THE PREFERRED EMBODIMENTS

Figure 1:
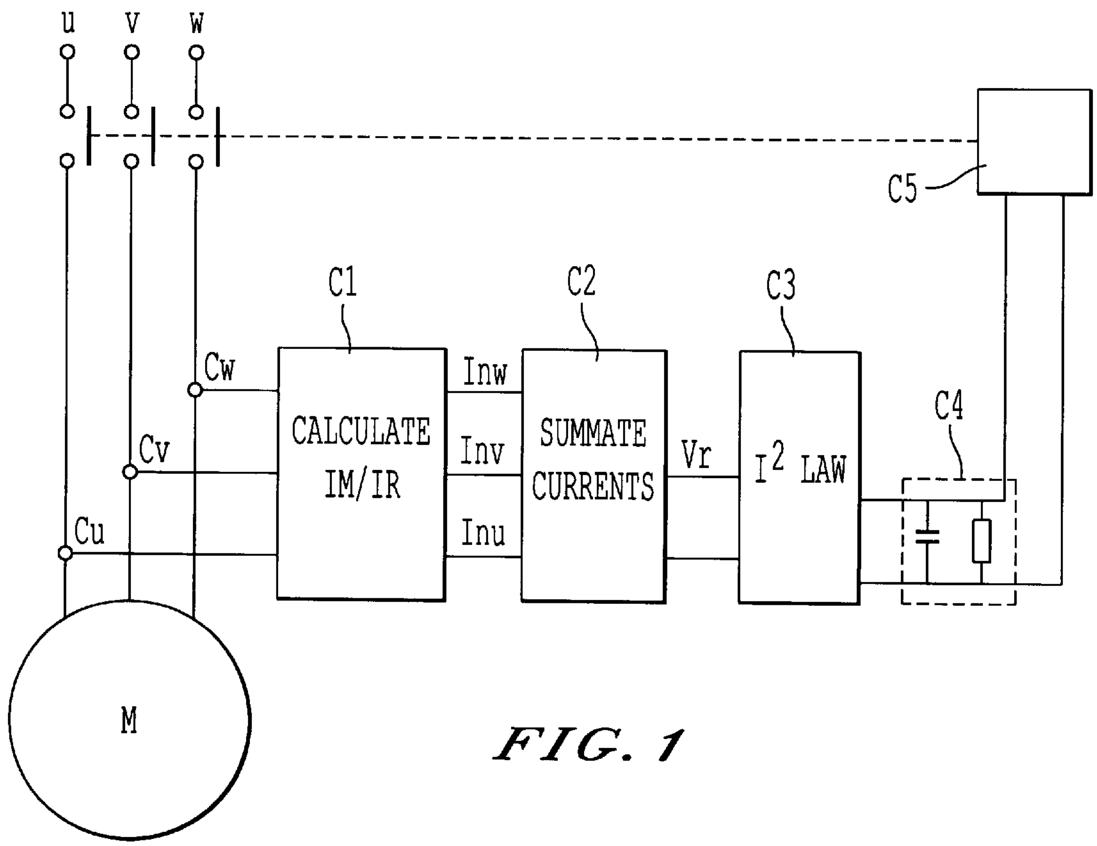
FIG. 1 is a general diagram of the modeling device according to the invention.

The device according to the invention as illustrated in FIG. 1 is designed to model the temperature rise of a three-phase electrical motor M which is powered by U, V and W phase lines.

A current sensor Cu, Cv and Cw is placed on each phase line U, V and W respectively, and this sensor outputs a voltage which is an image of the motor current Im in the corresponding phase.

Each output voltage from each respective current sensor Cu, Cv, Cw is output to a normalization circuit C1 that outputs a current called the "normalized" current which is proportional to the ratio of the motor current to the adjustment current Ir, for each of the three phases.

The three "normalized" currents Inu, Inv, Inw are sent to a summation circuit C2 which outputs a voltage Vr proportional to the sum of the three currents Inu, Inv, Inw, images of the respective Im/Ir ratios.

The voltage Vr which is the image of the Im/Ir ratio is sent to a calculation circuit C3 which outputs a current wave stream Ig, the amplitude and duration of which are both proportional to the input voltage Vr.

The current wave stream Ig is injected into an PC type modeling circuit C4, the function of which is to model the motor temperature.

Figure 2:
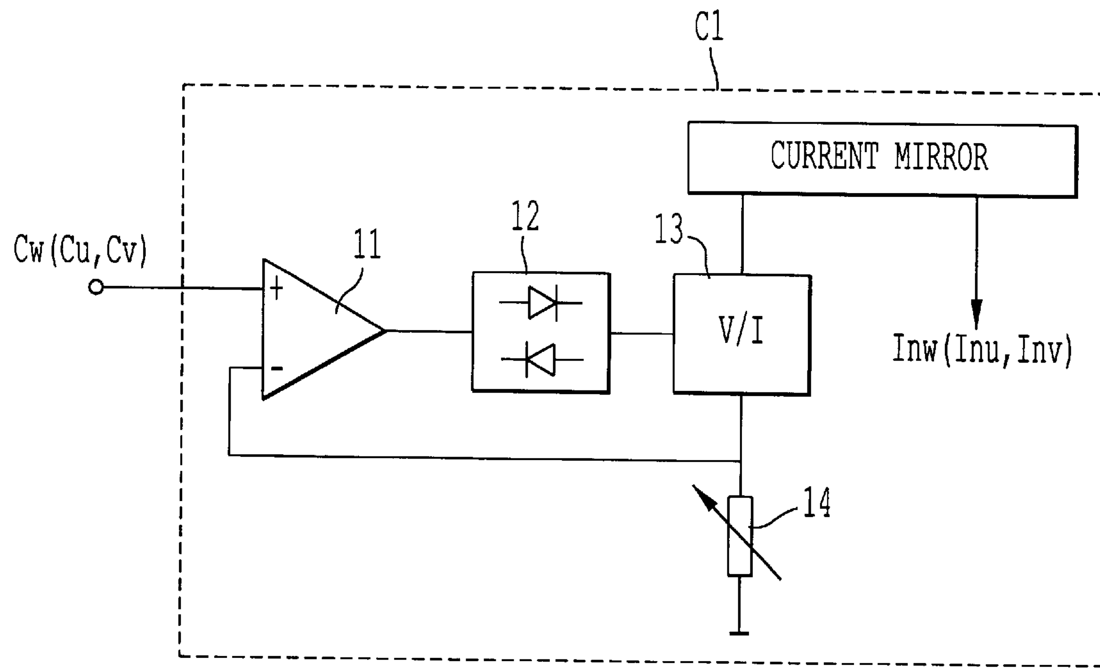
FIG. 2 shows a "normalization" circuit that forms part of the device in FIG. 1.

The "normalization" circuit C1 as illustrated in FIG. 2 comprises a comparator 11 for each phase, which receives as an input the signal from a current sensor (such as Cw) which is a voltage proportional to the motor current Im in the phase. This comparator operates through a rectifier circuit 12 to control a circuit 13 associated with a variable resistance 14 defining the adjustment current Ir and generating a "normalized" current (for example Inw) which is proportional to the Im/Ir of the particular phase ratio. The various "normalized" currents Inu, Inv, Inw are sent by a current mirror to the current summation circuit C2.

Figure 3:
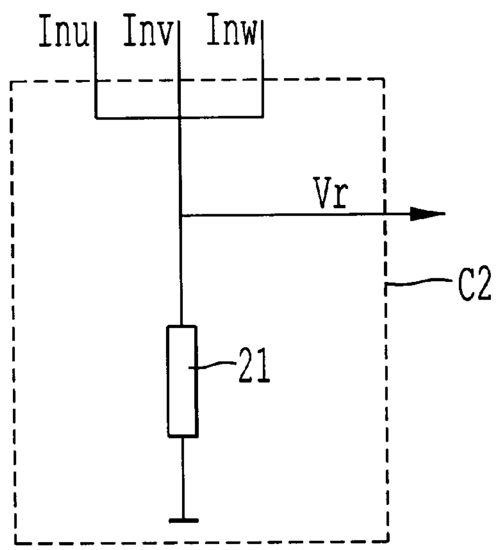
FIG. 3 shows a summation circuit for currents forming part of the device in FIG. 1.

The various "normalized" currents Inu, Inv, Inw are input to the resistance 21 in the "normalized" current summation circuit C2 as illustrated in FIG. 3. The voltage Vr at the terminals of resistance 21 is of the three-phase, rectified, double alternating type, and is proportional to the sum of the "normalized" currents Inu, Inv, Inw.

Figure 4:
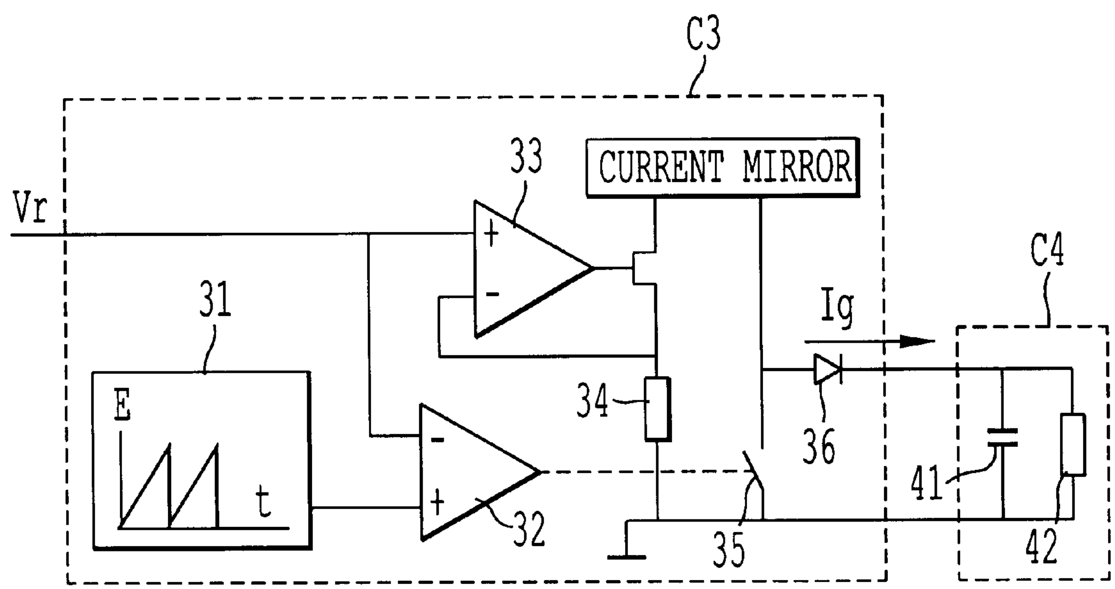
FIG. 4 a shows a calculation circuit and an associated modeling circuit that form part of the device in FIG. 1.
Figure 5A:
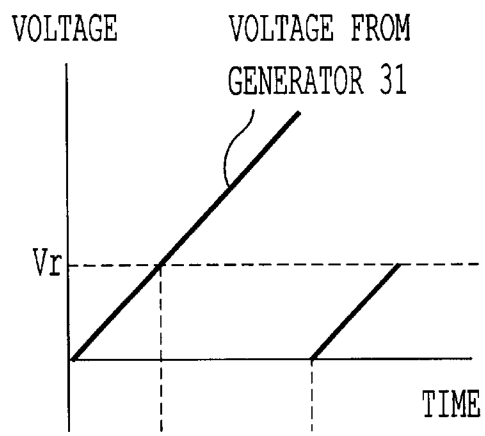
FIG. 5 shows time diagrams illustrating operation of the device.
Figure 5B:
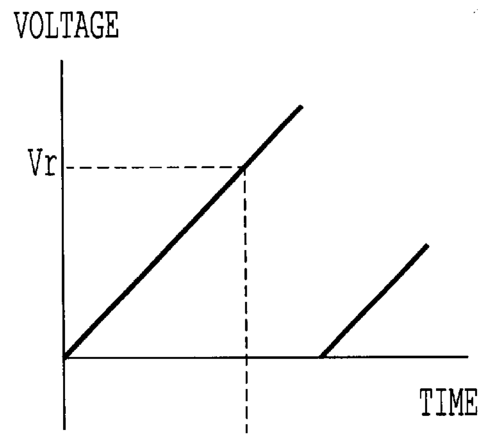
Figure 5C:
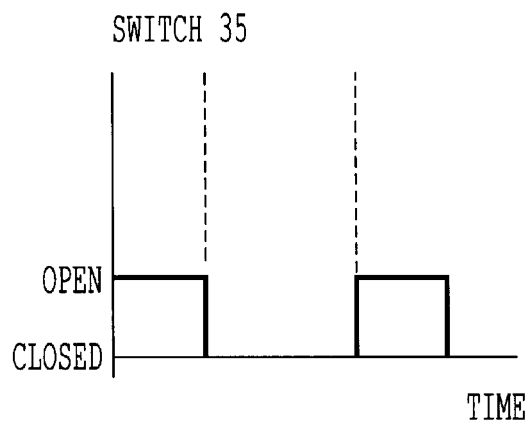
Figure 5D:
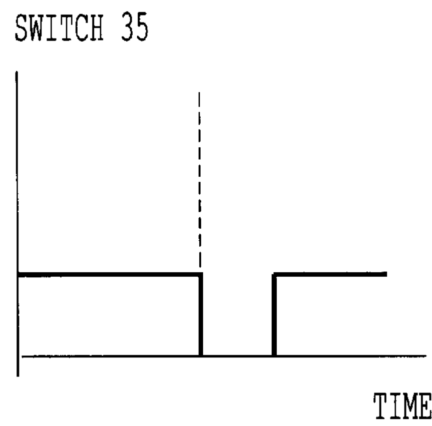
Figure 5E:
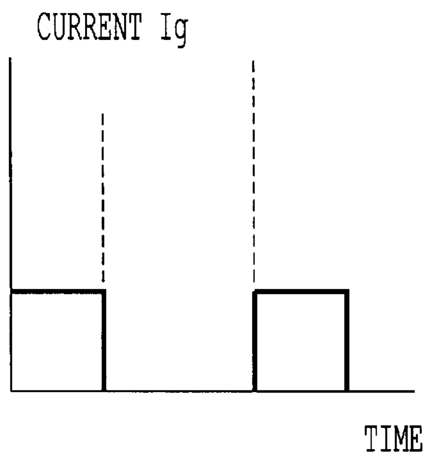
Figure 5F:
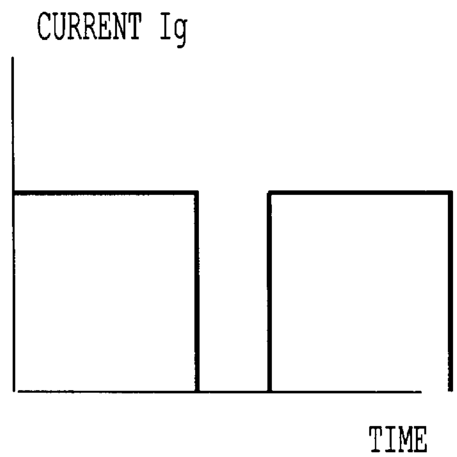

The voltage Or, image of the Im/Ir ratio is sent into the calculation circuit C3 which is illustrated in FIG. 4, onto a comparator 33 and a comparator 32. The comparator 33 receives the "image" voltage Vr and controls the current output to resistance 34, this current being proportional to the sum of the "normalized" currents. An image of this current is applied through a current mirror onto a current path on which a static sampling switch 35 is placed. The comparator 32 receives firstly a triangular saw tooth voltage generated by a ramp generator 31 and also the "image" voltage Vr, and it controls the static sampling switch 35 which chops a current Ig which is the image of the sum of the "normalized" currents.

The chopped current Ig is injected into a circuit C4 which is the motor temperature modeling circuit, which comprises a capacitor 41 and a resistance 42. A diode 36 prevents charges of capacitor 41 from being injected into circuit C3. This circuit C4 controls a control circuit CS.

The operation of the device will now be explained.

Each current sensor Cu, Cv, Cw outputs an AC voltage, the amplitude of which is proportional to the motor current Im circulating in the corresponding phase.

With reference to circuit C1, the resistance 14 is proportional to the adjustment current Ir, and the double alternation rectified current denoted Inu, Inv or Inw which is output from the circuit is proportional to the ratio of the motor current to the adjustment current. It is said to be "normalized".

The various "normalized" currents are added in the summation circuit C2 that outputs a DC "image" voltage Vr which is proportional to the sum of the three "normalized" currents Inu, Inv, inw.

The "image" voltage Vr is output to the calculation circuit C3 that outputs a current wave stream in which each current wave has an amplitude proportional to the "image" voltage Vr and its duration is also proportional to this "image" voltage Vr.

Consider the timing diagram in FIG. 5. The ramp generator 31 outputs a saw tooth voltage E with a constant period denoted T. The variable duration during which the static sampling switch 35 is open is denoted t. The charge current Ig is output from calculation circuit C3 during this time t.

The charge current wave stream Ig has an amplitude and duration which are each proportional to the voltage Vr that is an image of the Im/Ir ratio. The time during which switch 35 is open is also proportional to By comparing the left and right parts of FIG. 5, it can be seen that the amplitude and duration increase simultaneously when the voltage Vr increases.

When the static switch 35 is closed, the current Ig is zero and the capacitor 41 does not charge. When the static switch 35 is open, the current Ig is injected into the capacitor 41 over a period of time which charges. The average quantity of charges sent to capacitor 41 is equal to the product of the charging current Ig to the injection time. Therefore it is proportional to the square of the voltage Vr. Diode 36 prevents the capacitor 41 from discharging to switch 35.

Obviously, it would be possible to imagine variants and improvements to detail, and even to envisage the use of the equivalent means, without going outside the framework of this invention.

What is claimed is:

1. An electronic device for modeling the thermal state of a motor by utilizing a plurality of signals output from a respective of a plurality of current sensors placed on a respective of a plurality of power supply phases of the motor, comprising:

interface means for receiving the signals output from the current sensors and for outputting a voltage which is an image of a summation of a ratio of the motor currents sensed by each of the current sensors to a corresponding adjustment current for each of the phases;

calculation means for receiving the voltage output from said interface means as an input and for outputting a charging current wave stream, an amplitude and duration of the charging current wave stream both being proportional to the summation of the ratio; and modeling circuit means for receiving the charging current wave stream output from said calculation means and for modeling the thermal state of the motor based on the charging current wave stream.

2. An electronic device according to claim 1, wherein said interface means includes for each current sensor a normalization circuit for outputting a normalized current proportional to the ratio of the motor current to the adjustment current for the respective current sensor, and a summation circuit for summating the normalized currents from each of the current sensors and for outputting an image voltage proportional to the sum of the summated normalized currents.

3. An electronic device according to claim 1, wherein the calculation means controls a sampling switch that chops a current proportional to the sum of the normalized currents, in order to generate the charging current wave stream.

4. An electronic device according to claim 3, wherein the calculation means comprises a comparator, into which are input a signal from a saw tooth voltage generator and the voltage proportional to the summation the ratio of the motor current to the adjustment current, and which controls the sampling switch.

5. An electronic device for modeling the thermal state of a motor by utilizing a plurality of signals output from a respective of a plurality of current sensors placed on a respective of a plurality of power supply phases of the motor, comprising:

an interface circuit configured to receive the signals output from the current sensors and to output a voltage which is a summation of an image of a ratio of the motor currents sensed by each of the current sensors to a corresponding adjustment current for each of the phases;

a calculation circuit configured to receive the voltage output from said interface circuit as an input and for outputting a charging current wave stream, an amplitude and duration of the charging current wave stream both being proportional to the summation of the ratio; and a modeling circuit configured to receive the charging current wave stream output from said calculation circuit and to model the thermal state of the motor based on the charging current wave stream.

6. An electronic device according to claim 5, wherein said interface current includes for each current sensor a normalization circuit for outputting a normalized current proportional to the ratio of the motor current to the adjustment current for the respective current sensor, and a summation circuit for summating the normalized currents from each of the current sensors and for outputting an image voltage proportional to the sum of the summated normalized currents.

7. An electronic device according to claim 5, wherein the calculation circuit is configured to control a sampling switch that chops a current proportional to the sum of the normalized currents, in order to generate the charging current wave stream.

8. An electronic device according to claim 7, wherein the calculation circuit comprises a comparator, into which are input a signal from a saw tooth voltage generator and the voltage proportional to the summation of the ratio of the motor current to the adjustment current, and which is configured to control the sampling switch.

* * * * *